JULIUS B. SCHULTZ
INVENTOR.

United States Patent Office 3,086,792
Patented Apr. 23, 1963

3,086,792
VEHICLE SUSPENSION SYSTEM
Julius B. Schultz, Detroit, Mich., assignor to Ford Motor Company, Dearborn, Mich., a corporation of Delaware
Filed Dec. 15, 1960, Ser. No. 76,023
4 Claims. (Cl. 280—96.2)

This invention relates to vehicle suspension systems and more particularly to a lightweight independent front suspension system.

Introduction

In the conventional independent front suspension systems for motor vehicles, upper and lower support arms are pivotally mounted on vehicle body or chassis structure and a wheel supporting spindle is universally connected to the outer ends of the support arms. A suspension spring is then interposed between one of the support arms and reinforced body or chassis structure. The body is thus resiliently supported through the spring on the road wheel. With this arrangement wheel loads are carried by the universal connection between the spindle and the support arms as well as in the support arms themselves.

In order to provide a more lightweight construction and to improve the distribution of wheel loads, the present invention provides a novel independent front suspension system employing a kingpin and wheel spindle assembly upon which the suspension spring is directly mounted. With this construction, wheel loads are transferred directly from the spindle to the kingpin and from there to the suspension spring. Thus, the upper and lower support arms and the universal connections between the kingpin and the support arms do not carry the wheel loads and may therefore be of lightweight construction.

More specifically, in the presently preferred embodiment of the invention, ball joint connections are used to join the arms with the kingpin. Due to the advantageous load distribution these joints employ lightweight stamped metal socket members and ball members formed from expanded tubing. The wheel spindle and kingpin are formed from solid stock by cold forging.

Objects

In view of the foregoing, it is one of the principal objects of the present invention to provide an improved objects of the present invention for vehicles in which the independent front suspension for vehicles in which the suspension spring is connected directly to a lightweight wheel spindle and kingpin assembly.

It is one of the specific objects of the present invention to provide a vehicle spring mounting means having a coil spring interposed between a body bracket and a spring seat carried by a kingpin.

It is another object of the present invention to have a lightweight vehicle suspension system employing ball joints that have stamped metal socket members and ball members formed by expanding a piece of tubing.

These and further objects of the present invention will be more fully comprehended from the following description and the accompanying drawings which disclose a vehicle suspension construction incorporating the invention.

The Drawings

Figure 1:
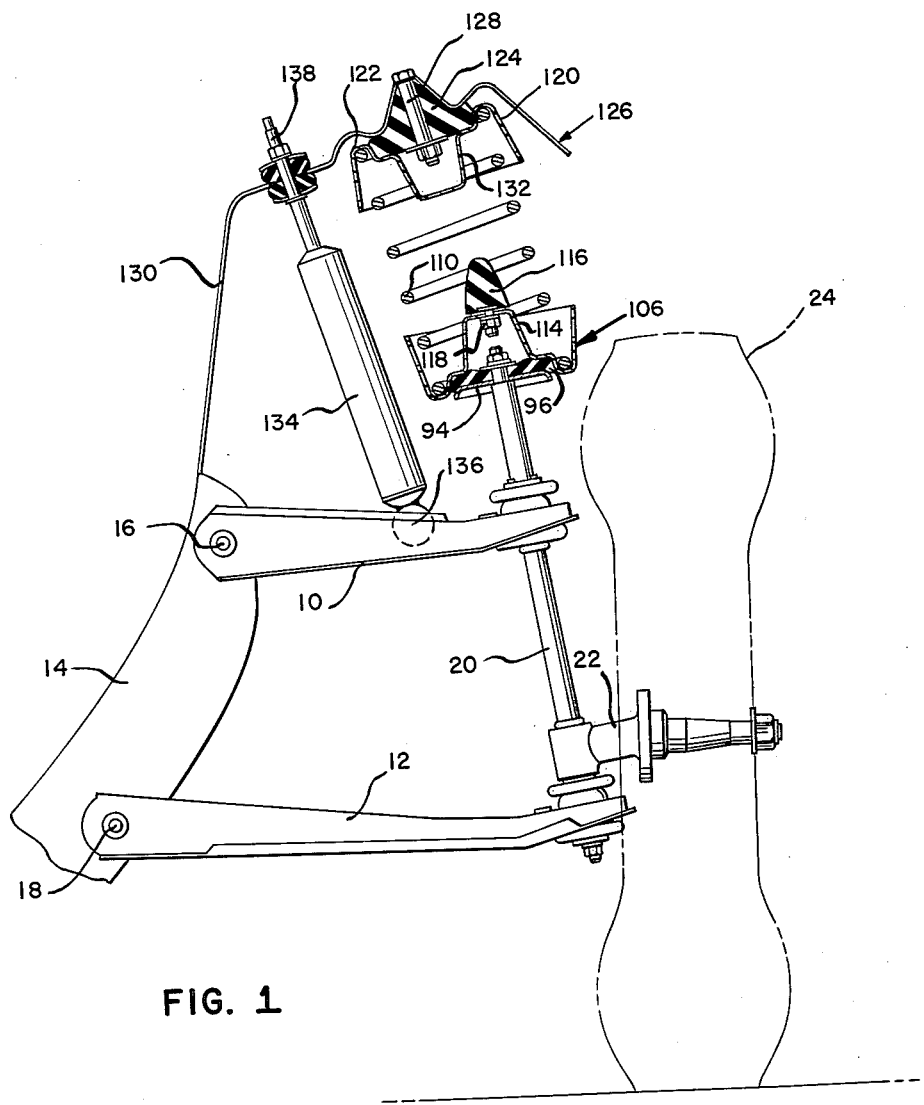
Figure 2:
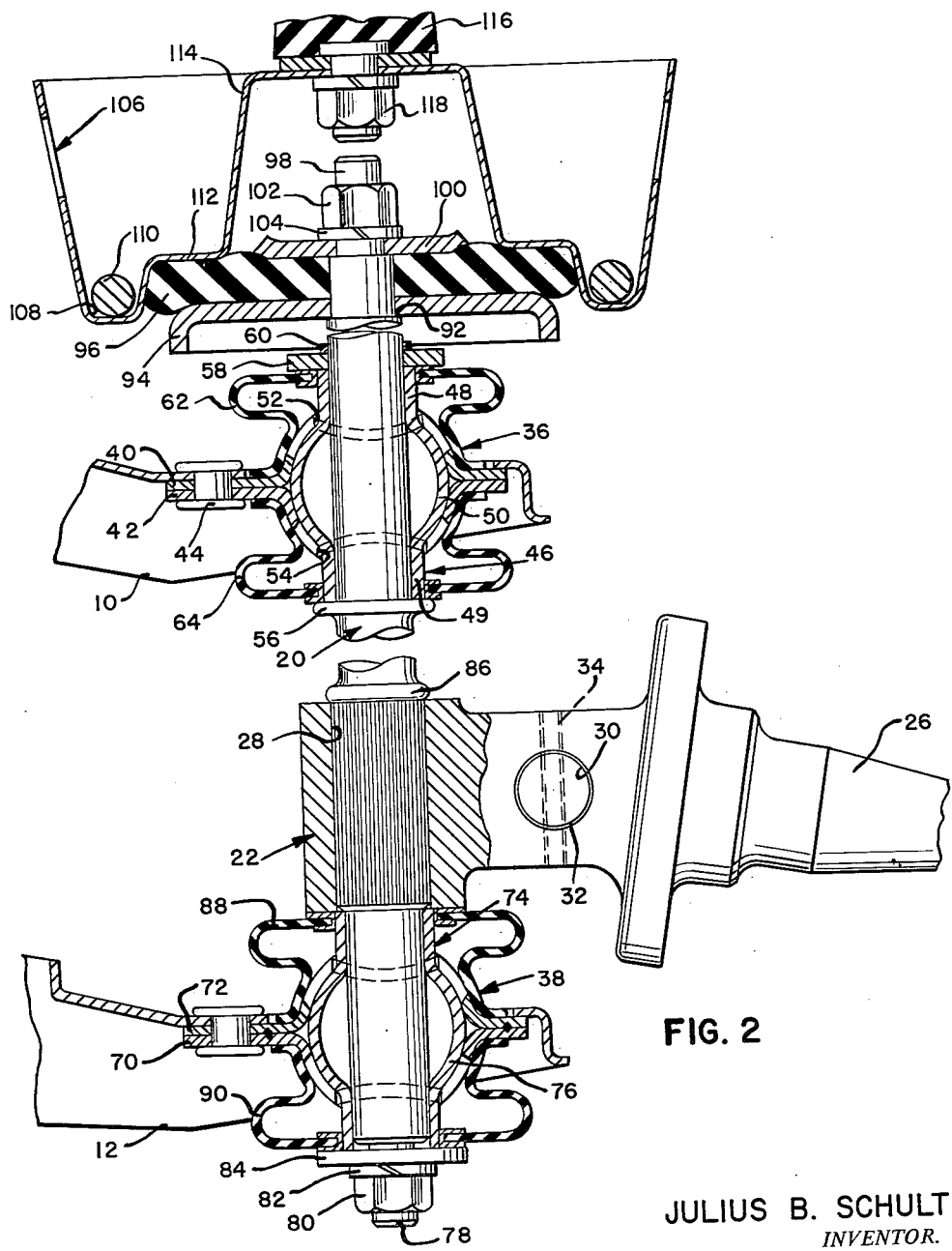

FIGURE 1 is a diagrammatic view of an independent front vehicle suspension system employing the present invention, and FIGURE 2 is an elevational view partly in section of a portion of the suspension system shown in FIGURE 1.

Description

Referring now to the drawings, wherein the presently preferred embodiment of the present invention is disclosed, an independent front suspension system is shown in FIGURE 1. This suspension system includes upper and lower support arms 10 and 12 that are pivotally connected at their inner ends to support structure such as a cross-frame member 14 of a vehicle chassis. The arms 10 and 12 are mounted at pivot points 16 and 18 on the frame 14. The outer ends of both support arms 10, 12 are universally connected to a kingpin 20. The kingpin 20 carries a wheel spindle 22 that in turn rotatably supports a road wheel 24.

Referring to FIGURE 2, it is seen that the kingpin 20 has a generally shaft-like configuration. Preferably, it is formed of solid stock by cold forging. The wheel support spindle 22 is similarly formed by cold forging. It is provided with an outer shaft end 26 upon which the wheel 24 is rotatably mounted by a span of bearings (not shown). The inner end of the spindle 22 is bored out at 28 to receive the shaft-like kingpin 20.

Complementary serrations are provided in the bore 28 of the spindle 22 and on the kingpin 20 so as to have a rigid connection therebetween when the members are brought together by a press fit. The spindle 22 is provided with an opening 30 in its midregion into which a steering arm 32 is fitted. The arm 32 is locked in place by roll pin 34.

The upper and lower arms 10 and 12 are connected to the kingpin 20 by upper and lower ball joint assemblies 36 and 38. These ball joint assemblies are of generally similar configuration. The upper ball joint assembly 36 comprises upper and lower shell-like stamped metal socket members 40 and 42 that are joined to the outer end of the upper arm 10 by fastening means such as rivets 44. The socket members 40 and 42 journal a ball member 46 that may be formed from a sheet metal tube. The tube is expanded to form a ball portion 50 that is seated within the socket members 40 and 42. Upper and lower extensions of the ball 50 are tubular and closely fit about the kingpin 20. These tubular portions are identified as 48 and 49.

The socket members 40, 42 are provided with openings through which the tubular ends 48 and 49 of member 46 extend. These openings are indicated at 52 and 54. The end 49 of ball member 46 is positioned by a flange 56 formed in the kingpin 20. The upper end 48 of piece 46 is located by a washer 58 and a snap ring 60. A pair of flexible rubber seals 62 and 64 are positioned over the openings 52, 54 of the socket members 40, 42 and against washer 58 and flange 56 respectively.

The lower ball joint assembly 38 is of generally similar construction having sheet metal socket members 70 and 72 riveted to the outer end of the lower support arm 12. A tubular bearing member 74 having a central portion expanded to the shape of a ball 76 is seated in the socket 70, 72.

The lower end 78 of the kingpin 20 is threaded to receive a nut 80 and lock washer 82 that cooperates with a flat washer 84. The upper end of the bearing member 74 rests against the inner end of the spindle 22. The spindle 22 in turn is located on the kingpin shaft 20 by flange 86. Thus, the tightening of nut 80 secures the ball member 74 and spindle 22 in position. Rubber dust shields 88 and 90 are positioned over the ends of the ball member 74. The ball joint assemblies 36 and 38 permit the kingpin 20 and the spindle 22 to rotate about the axis of the kingpin 20 as well as about axes parallel to the pivots 16 and 18.

Means are provided to seat a coil spring upon the end of the kingpin 20. The upper end 98 of the kingpin 20 is provided with a shoulder 92 upon which a washer-like support plate 94 rests. A flat rubber insulator 96 is passed over the upper end 98 of the kingpin 20 and rests against the support plate 94. An insulator retainer 100 is secured against the insulator 96 by a nut 102 and lock washer 104 that are threadably received on end 98 of the kingpin 20.

A sheet metal spring seat 106 is mounted on the insulator 96 and has an annular access 108 in which the lower coil of a coil spring 110 is seated. A ledge 112 is provided in the seat 106 and is bonded to the insulator 96. The seat 106 has an upstanding central portion 114 upon which a rubber compression bumper 116 is secured by a nut 118.

A spring pan 120 of configuration similar to the lower spring seat 106 has a annular recess 122 in which the upper coil of spring 110 is retained. The pan 120 is bonded to a conically shaped rubber insulator 124 which in turn is secured to body sheet metal 126 by a bolt 128. A portion of the sheet metal 126 forms a vehicle fender. The fender 126 is contoured to receive the rubber piece 124. The inner fender skirt portion 130 of the sheet metal 126 is welded to the frame structure 14.

A depending central portion 132 is provided in the upper spring pan 120 as a striker for the upstanding compression bumper 116. During extreme jounce the rubber 116 will strike the portion 132 of the spring seat 120 to provide a resilient stop to further suspension deflection.

A telescopic shock absorber 134 is pivotally connected at its lower end 136 to the upper support arm 10. The upper end 138 of the shock absorber 134 is mounted in rubber to the fender skirt 130. The shock absorber 134 acts to dampen suspension deflection.

It has been found that a bearing is not required between the kingpin 20 and the coil spring 110. When the wheel spindle 22 is turned by forces applied to the steering arm 30, the kingpin 20 will rotate through a relatively small arc of approximately 35 degrees in either direction from a neutral position. This will cause the coil spring 110 to wind up or unwind approximately only one-tenth of a coil.

*Conclusion*

The foregoing construction provides a lightweight efficient front suspension system for a vehicle. Wheel loads are transferred through the spindle 22 and the kingpin 20 directly to the spring seat 106 and from there to the suspension spring 110. The intermediate insulator rubber member 96 helps to isolate objectionable vibrations.

The foregoing description constitutes the presently preferred embodiment of this invention, however, modifications and alterations may occur to those skilled in the art which will come within the scope and spirit of the following claims.

I claim:

1. A vehicle suspension system comprising:
pivotally mounted upper and lower arms;
a rod-like member;
a hollow sheet metal ball member having integral upper and lower cylindrical portions fitted about the lower end of said rod member;
a wheel support member secured to said rod member above said ball member;
a second hollow sheet metal ball member having integral upper and lower cylindrical portions fitted about said rod member above said wheel support member;
socket members carried by the outer end of said arms encasing said ball members;
a disk-like insulator element carried by the upper end of said rod member;
a spring seat secured to said insulator element;
a second spring seat secured to vehicle structure;
and a coil spring interposed between said seats.

2. A vehicle suspension system comprising:
pivotally mounted upper and lower arms;
a rod-like member;
a hollow sheet metal ball member having integral upper and lower cylindrical portions fitted about the lower end of said rod member;
a wheel support member secured to said rod member above said ball member;
a second hollow sheet metal ball member having integral upper and lower cylindrical portions fitted about said rod member above said wheel support member;
socket members carried by the outer end of said arms encasing said ball members;
an insulator element carried by the upper end of said rod member;
a spring seat secured to said insulator element;
a second spring seat secured to vehicle structure;
a coil spring interposed between said spring seats;
one of said seats carrying a rubber bumper concentrically within said spring seats and other of said seats carrying a striker cooperating with said rubber bumper to limit extreme deflection of said suspension system.

3. An independent suspension system for a vehicle comprising:
pivotally mounted upper and lower arms;
annular bearing elements secured to the outer ends of said arms;
hollow sheet metal ball members mounted in said bearing elements;
said members having integral upper and lower cylindrical portions protruding through said bearing elements;
wheel support means having a rod-like portion secured concentrically within said cylindrical portions;
the upper end of said rod-like portion protruding upwardly through said upper ball member;
and a suspension spring mounted on the end of said rod-like portion.

4. An independent suspension system for a vehicle comprising:
pivotally mounted upper and lower arms;
annular bearing elements secured to the outer ends of said arms;
hollow sheet metal ball members mounted in said bearing members;
said members having integral upper and lower cylindrical portions protruding through said bearing elements;
wheel support means having a rod-like portion secured concentrically within said cylindrical portions;
the upper end of said rod-like portion protruding upwardly through said upper ball member;
a spring seat carried by the upper end of said rod-like portion;
a second spring seat carried by vehicle structure;
a coil spring interposed between said seats;
one of said seats having a rubber bumper concentrically within said spring and other of said seats having a striker cooperating with said rubber bumper to limit extreme deflection of said suspension system.

References Cited in the file of this patent

UNITED STATES PATENTS

| | | |
|---|---|---|
| 2,718,409 | Kishline et al. | Sept. 20, 1955 |
| 2,756,067 | Porsche et al. | July 24, 1956 |
| 2,768,848 | Mitchell et al. | Oct. 30, 1956 |
| 2,856,198 | Muller | Oct. 14, 1958 |
| 2,876,018 | Kishline et al. | Mar. 3, 1959 |
| 3,007,728 | Hoffman | Nov. 7, 1961 |

FOREIGN PATENTS

| | | |
|---|---|---|
| 1,164,889 | France | May 19, 1958 |